(12) United States Patent
Bochum et al.

(10) Patent No.: US 6,668,782 B2
(45) Date of Patent: Dec. 30, 2003

(54) SYSTEM AND METHOD OF CONTROLLING THE ACTIVATION OF A VACUUM-DRIVEN ACTUATOR

(75) Inventors: Hansjoerg Bochum, Novi, MI (US); Alois Moser, Ann Arbor, MI (US); Gunter Mueller, West Bloomfield, MI (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 10/133,664

(22) Filed: Apr. 26, 2002

(65) Prior Publication Data

US 2003/0200949 A1 Oct. 30, 2003

(51) Int. Cl.[7] .............................................. F02M 35/10
(52) U.S. Cl. ............................. 123/184.55; 123/184.53
(58) Field of Search ..................... 123/184.55, 568.29, 123/339.28, 184.53

(56) References Cited

U.S. PATENT DOCUMENTS

| 4,289,107 | A | * | 9/1981 | Peters | 123/339.28 |
|---|---|---|---|---|---|
| 4,608,948 | A | * | 9/1986 | Inoue et al. | 123/184.53 |
| 4,633,845 | A | | 1/1987 | Seleno | |
| 4,928,638 | A | | 5/1990 | Overbeck | |
| 5,197,433 | A | | 3/1993 | Dykstra et al. | |
| 5,638,785 | A | | 6/1997 | Lee | |
| 5,687,684 | A | | 11/1997 | Verkleeren | |
| 5,740,770 | A | | 4/1998 | Morota | |

* cited by examiner

*Primary Examiner*—Henry C. Yuen
*Assistant Examiner*—Katrina B. Harris
(74) *Attorney, Agent, or Firm*—Michael Best & Friedrich LLP

(57) ABSTRACT

A method and system of controlling a vacuum-driven actuator in a vehicle. The method includes determining an amount of vacuum available to actuate the actuator, determining whether the available vacuum is sufficient to actuate the actuator, actuating the actuator only when the available vacuum is sufficient, and preventing actuation of the actuator when the available vacuum is insufficient.

20 Claims, 4 Drawing Sheets

SYSTEM AND METHOD OF CONTROLLING THE ACTIVATION OF A VACUUM-DRIVEN ACTUATOR

FIELD OF THE INVENTION

The invention relates to vacuum-driven actuators, and more particularly to the control of vacuum driven actuators.

BACKGROUND OF THE INVENTION

It is known to use vacuum-driven actuators in automobiles. One example of a vacuum-driven actuator is an actuator flap of a variable intake manifold. A vacuum is built up during a throttled engine operation within the intake manifold and is generally stored in a reservoir for future actuation of the flap. A pressure equalization and a vacuum reduction take place with every activation of the actuator, but under normal driving conditions, the vacuum level rebuilds quite quickly.

However, there are driving conditions, particularly full load or the stratified charge operation of direct injection engines, under which the intake manifold vacuum may not be re-generated quickly enough to ensure sufficient switching or activation capacity. Extreme cases may result in either no actuation or incomplete actuation of the actuators. The consequences of activating a switching process in a two cylinder bank system without sufficient vacuum may include the switching of flaps in one bank while the flaps in the other bank are not switched, causing a clearly noticeable engine roughness, and apparent strong irregularities of the cylinder charge.

SUMMARY OF THE INVENTION

Rather than risking an incomplete switching as a result of an insufficient vacuum, it is desirable to detect such a condition before the activation is attempted in order to prevent incomplete switching of the actuator.

In one embodiment, the present invention provides a method of determining whether the vacuum within the vacuum reservoir is sufficient to completely execute the desired actuator movement before activating the switching process. If the available vacuum is insufficient, the switching process is disabled until enough vacuum becomes available. The method of the invention is well suited for application where no vacuum pumps are used.

The present invention also provides a method of controlling a vacuum-driven actuator in a vehicle. The method includes determining the actuator is to be actuated, determining an amount of vacuum available to actuate the actuator, and determining whether the available vacuum is sufficient to actuate the actuator. The method further includes actuating the actuator only when the available vacuum is sufficient, and preventing actuation of the actuator when the available vacuum is insufficient.

In one aspect of the invention, the vehicle includes a vacuum reservoir for storing the available vacuum, and determining the amount of vacuum available further includes determining a manifold pressure, and using the determined manifold pressure to determine a reservoir pressure. In another aspect of the invention, determining the amount of vacuum available further includes determining an amount of vacuum lost from the vacuum reservoir during a previous actuation of the actuator, and determining a new reservoir pressure based on the amount of vacuum lost. In yet another aspect of the invention, the vehicle includes a vacuum reservoir for storing the available vacuum, and determining the amount of vacuum available includes modeling the reservoir pressure.

The present invention also provides an actuator control system in a vehicle. The control system consists of a switching monitor operable to determine when the actuator is to be actuated, a vacuum level module operable to determine an amount of vacuum available to actuate the actuator, a switch operable to actuate the actuator, and a switch controller operable to determine whether the available vacuum is sufficient to actuate the actuator, and to actuate the switch only when the available vacuum is sufficient to actuate the actuator.

In one aspect of the invention, the vehicle includes a vacuum reservoir for storing the available vacuum, and the vacuum level module further includes a manifold pressure monitor operable to determine a manifold pressure, an ambient pressure monitor operable to determine an ambient pressure, and a reservoir pressure monitor operable to determine a vacuum reservoir pressure. In another aspect of the invention, the switch controller further includes a first comparator operable to find an absolute pressure difference between the ambient pressure and the reservoir vacuum pressure, and a second comparator operable to compare a pre-determined threshold and the absolute pressure difference.

Figure 1:
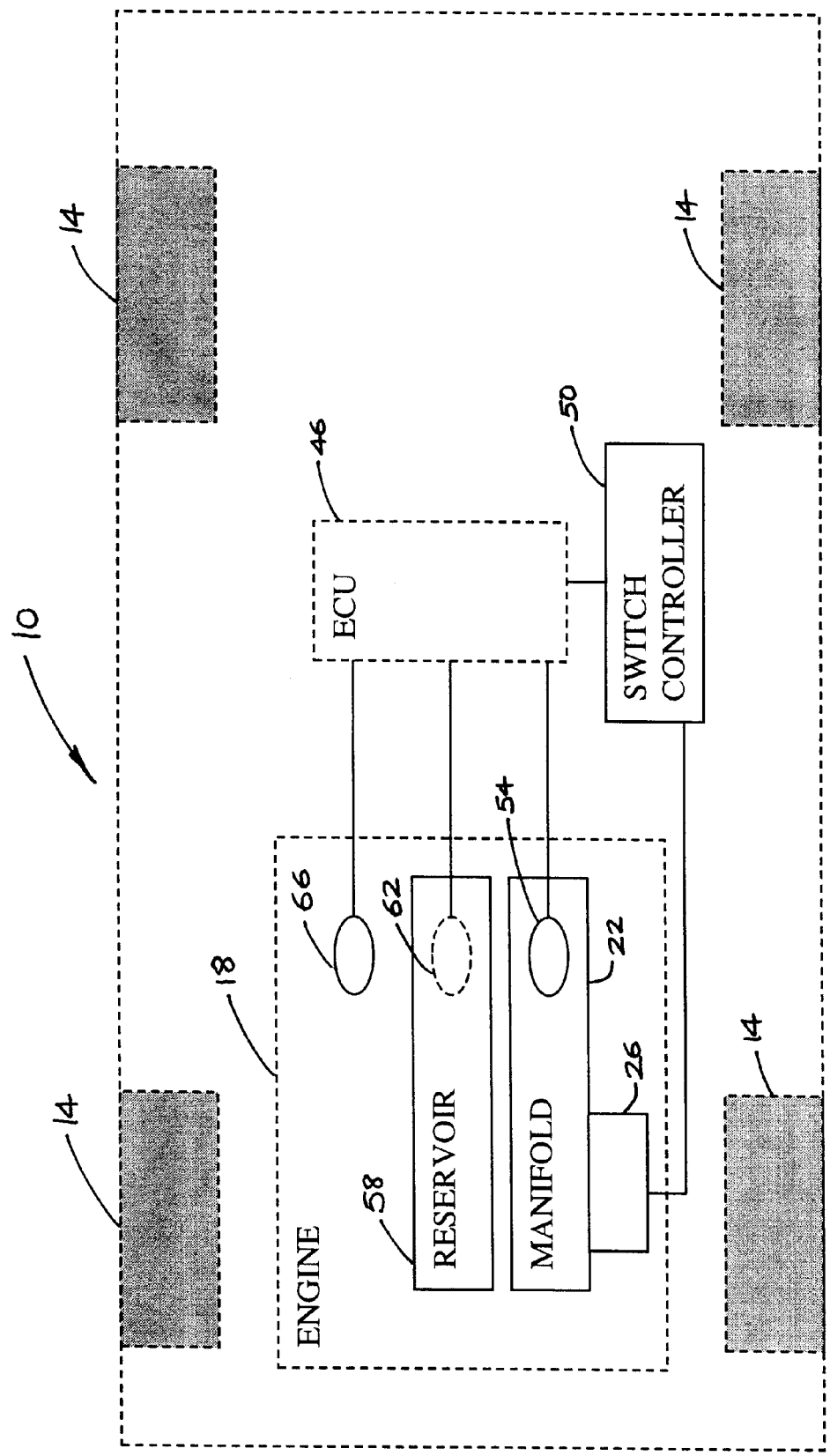
FIG. 1 illustrates a vehicle embodying an actuator switching system according to the present invention.

Before embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENT

Figure 2:
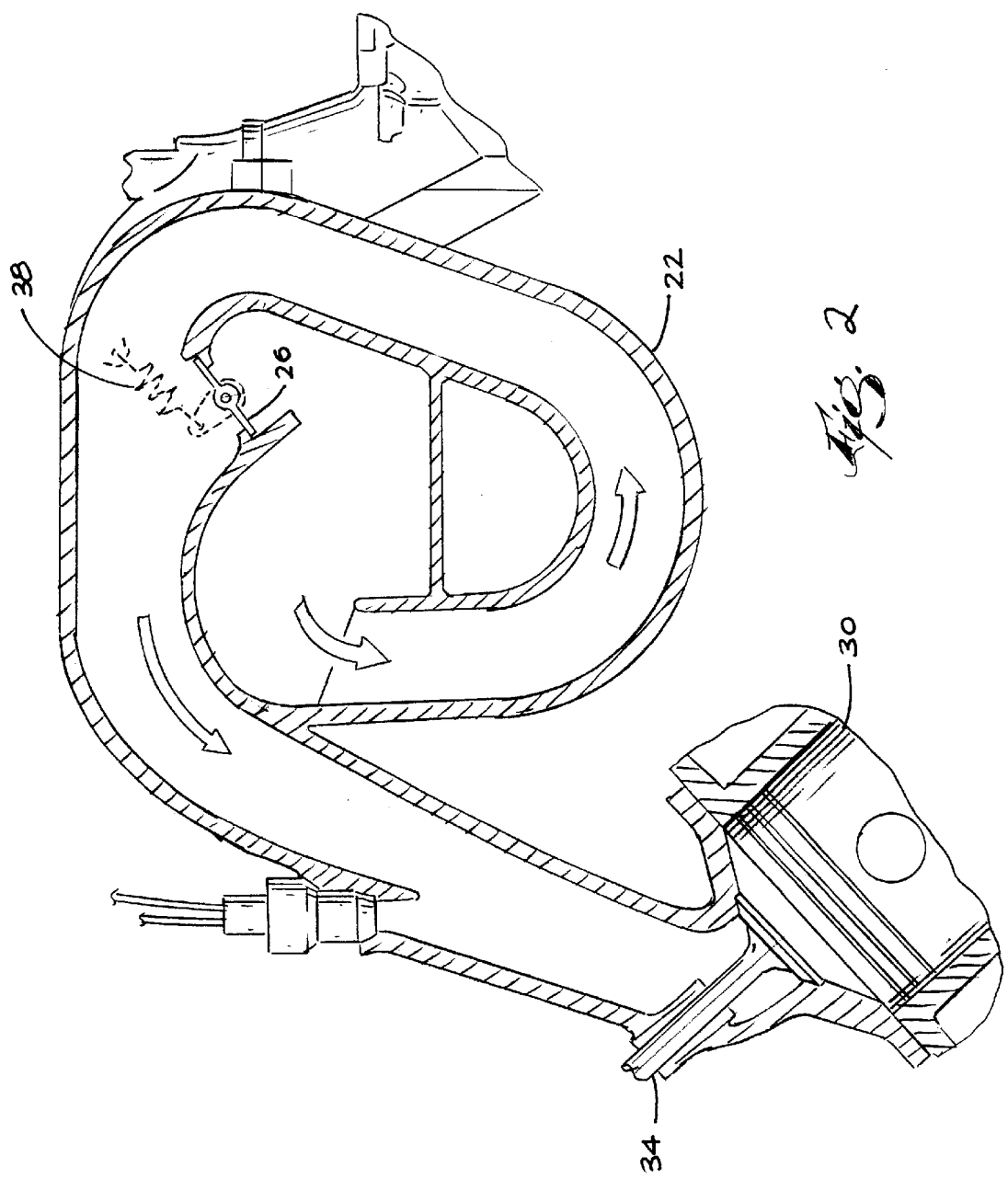
FIG. 2 illustrates a intake manifold with an actuator according to one embodiment of the invention.

FIG. 1 illustrates a vehicle 10 embodying the present invention. The vehicle 10 includes a set of wheels 14 and an engine 18. The engine 18 includes an air intake manifold or manifold 22. One example of an air intake manifold 22 is shown in FIG. 2. It is to be understood that the present invention is operable with manifolds having different configurations from that shown in FIG. 2.

The manifold 22 in FIG. 2 includes at least one vacuum-driven switch or actuator 26. The actuator 26 is operable to regulate an amount of air entering the manifold 22, as is commonly understood by those skilled in the art. When the actuator 26 is activated, the actuator 26 moves between a closed position (shown in FIG. 2) and an opened position (rotated up to about ninety degrees in a counter-clockwise direction from the position shown in FIG. 2). When the actuator 26 is open, the pressure in the manifold 22 causes additional air to flow into the manifold 22 and further into a cylinder 30 through an intake valve 34. The actuator activation process is described in greater detail below.

As illustrated in phantom lines in FIG. 2, the actuator 26 can be a loaded actuator having a spring 38 or other similar biasing member. The spring 38 biases the actuator 26 toward the closed position. As will be discussed below, the system and method of the present invention is operable for both a loaded actuator and an unloaded actuator.

Referring now to FIG. 1, the vehicle 10 further includes an engine control unit or a ECU 46, which controls many aspects of the vehicle's operation. In the illustrated embodiment, the ECU 46 also controls the activation of the actuator 26. The ECU 46 is operatively coupled to a switch controller 50 that controls the activation of the actuator 26. The ECU 46 also monitors a manifold pressure (pm) in the manifold 22 via a manifold pressure sensor 54. The manifold pressure sensor 54 can be any conventional pressure sensing device.

The ECU 46 further monitors/determines a reservoir pressure (pc) in a vacuum reservoir 58. The reservoir 58 stores the vacuum supply used to actuate the actuator 26. Preferably, the reservoir pressure (pc) is determined by the ECU 46 using a mathematical model that will be discussed in detail below. Alternatively, a reservoir pressure sensor 62 (shown in phantom) can be used to directly measure the reservoir pressure. The ECU 46 also monitors an ambient pressure (pa) of the ambient environment via an ambient pressure sensor 66. The ambient pressure sensor 66 can be any conventional pressure sensing device.

Figure 3:
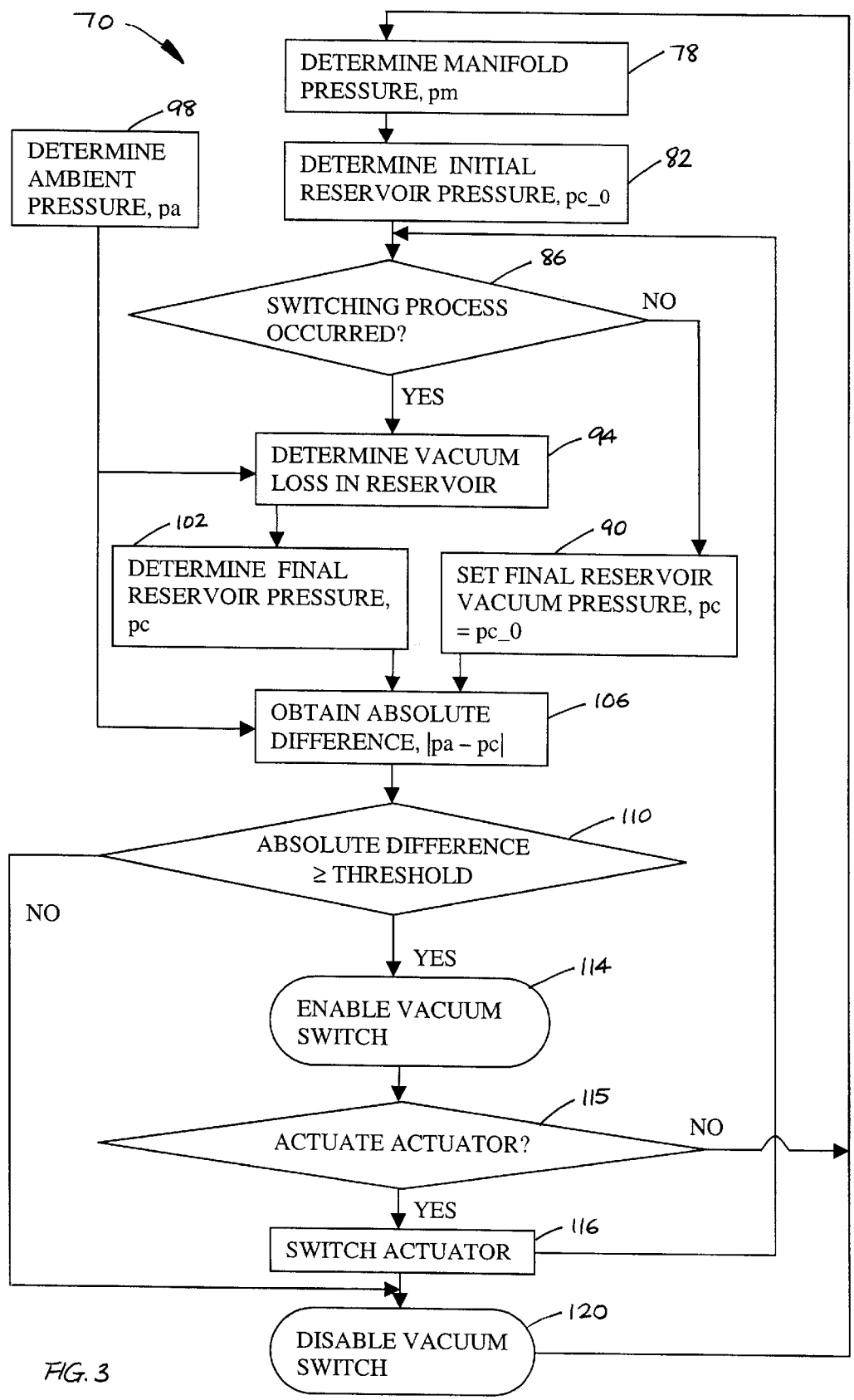
FIG. 3 is a flow chart outlining an actuation and control algorithm according to one embodiment of the invention.

The activation of the actuator 26 is controlled by the ECU 46 (or alternatively by a separate processor unit) using an actuation algorithm. FIG. 3 is a flow chart of an actuation algorithm or sequence 70 according to the one embodiment of invention. The algorithm 70 provides a method of determining whether the amount of vacuum within the vacuum reservoir 58 is sufficient to completely execute a desired actuator movement. This determination is made prior to enabling activation of the actuator 26. The algorithm 70 can be used to control one or more actuators 26 on substantially any manifold.

The algorithm 70, as shown in FIG. 3, first determines the manifold pressure pm at block 78. In the illustrated embodiment, the manifold pressure pm is determined using the manifold pressure sensor 54 communicating with the manifold 22 and the ECU 46. Of course, other methods of determining the manifold pressure pm can also be used.

At block 82, an initial reservoir pressure pc_0 is then determined using the manifold pressure value pm determined at block 78. The initial reservoir pressure pc_0 is preferably determined using a mathematical model that uses the previously determined manifold pressure pm to estimate the actual reservoir pressure. The mathematical model will be discussed in greater detail below. Alternatively, the reservoir pressure can be directly measured using the sensor 62 that communicates directly with the reservoir 58 and the ECU 46. In the illustrated embodiment, use of the mathematical model is preferred over use of the reservoir sensor 62 due to the cost savings realized by eliminating the reservoir sensor 62 and the associated wiring.

Once the initial reservoir pressure value pc_0 has been determined via mathematical modeling, the algorithm 70 determines at block 86 whether a previous actuator switching process has taken place since the initial reservoir pressure pc_0 has been determined. Recall that each actuator activation impacts the reservoir pressure. Therefore, if a previous actuation has occurred, the algorithm 70 can compensate by updating the modeled initial reservoir pressure value pc_0. Note that if the sensor 62 is used to directly measure the actual reservoir pressure, the determination made at block 86 is, generally, not necessary.

If the actuator has not been previously actuated (a "NO" answer at block 86), the algorithm 70 proceeds to block 90 where a final reservoir vacuum pressure pc is set to equal the initial reservoir pressure pc_0. In other words, because no switching process has previously occurred, the final reservoir vacuum pressure pc substantially equals the initial reservoir pressure pc_0.

However, if it is determined that a switching process or an actuation of an actuator 26 has already occurred (a "YES" answer at block 86), the algorithm 70 proceeds to block 94 to determine how much vacuum was lost in the reservoir 58 due to the previous switching process. The amount of vacuum lost in the reservoir 58 is determined at block 94 as a function of the pressure differential between the initial reservoir pressure pc_0 and the ambient pressure pa. A fixed percentage of the pressure difference can be selected as the adjustment factor representing the amount of vacuum lost in the previous switching process. The ambient pressure pa is determined at block 98 using the ambient pressure sensor 66. Alternatively, the amount of vacuum lost in a switching process can be assigned a fixed value that can be determined through testing, or can be assigned a certain percentage of the total vacuum in the reservoir 58.

A final reservoir pressure value pc is then determined at block 102 to compensate for the amount of vacuum lost in the previous switching process. The final reservoir pressure value pc is determined by adjusting the modeled initial reservoir pressure value pc_0 by the factor discussed above that is selected to represent the vacuum lost.

Using the appropriate final reservoir pressure value pc from block 90 or block 102, the algorithm 70 then determines the amount of vacuum available to actuate the actuator 26. At block 106, the algorithm 70 calculates the absolute difference between the final reservoir pressure pc and the ambient pressure pa, which is indicative of the amount of vacuum available to effect an actuation of the actuator 26.

If it is determined at block 110 that the absolute difference between the final reservoir pressure pc and the ambient pressure pa is greater than or equal to a predetermined threshold representative of the amount of vacuum needed to actuate the actuator 26 (a "YES" answer at block 110), a switch 162 (see FIG. 4) that is electrically connected to the switch controller 50 is enabled at block 114. When the switch 162 is enabled, the actuator 26 can be actuated. At block 115, the ECU 46 determines whether the actuator 26 is to be actuated. If the actuator 26 is to be actuated (a "YES" answer at block 115), the algorithm 70 proceeds to block 116 and the actuator 26 is actuated or switched. After actuation, the algorithm 70 returns to block 86 and the algorithm 70 is repeated for the next switching process. Alternatively, the algorithm 70 can return to block 78 and start over completely.

If, at block 115, the ECU 46 determines that actuator actuation is unnecessary, (a "NO" answer at block 115), the algorithm 70 returns to block 78 and repeats. One skilled in the art would understand that the determination made at block 115 can also be performed at the beginning of the algorithm 70 (e.g., prior to block 78), or at any other suitable point during the operation of the algorithm 70.

Returning to block 110, if it is determined that the absolute difference between the final reservoir pressure pc and the ambient pressure pa is less than the predetermined threshold representative of the amount of vacuum needed to actuate the actuator 26 (a "NO" answer at block 110), the switch 162 is disabled at block 120 so that the actuator 26 cannot be activated. If block 120 is reached, the algorithm 70 has determined that there is not enough vacuum currently available in the vacuum reservoir 58 to effect a complete switching of the actuator 26, and therefore, switching is not recommended. After the switch 162 is disabled at block 120, the algorithm 70 returns to block 78 and is repeated until a sufficient amount of vacuum has been built up in the reservoir 58.

The sequence 70 has heretofore been described for use with an unloaded actuator, meaning that each switching process (e.g., opened and closed) must be vacuum-driven. However, if the actuator is a loaded actuator, meaning that the flap is spring-loaded or otherwise biased to one of the opened or closed positions, as described above with respect to the spring 38 in FIG. 2, the algorithm 70 can be modified to run only when the upcoming switching process requires a supply of vacuum to effectuate the switching. In other words, if a vacuum supply is required to move the actuator 26 to the first or open position, but the actuator 26 will automatically return to the second or closed position via the biasing force of the spring 38, the algorithm 70 need only run when the actuator 26 is to be moved to the first or opened position. An actuator position monitor, which will be described in more detail below, can be used to determine the position of the actuator 26.

Figure 4:
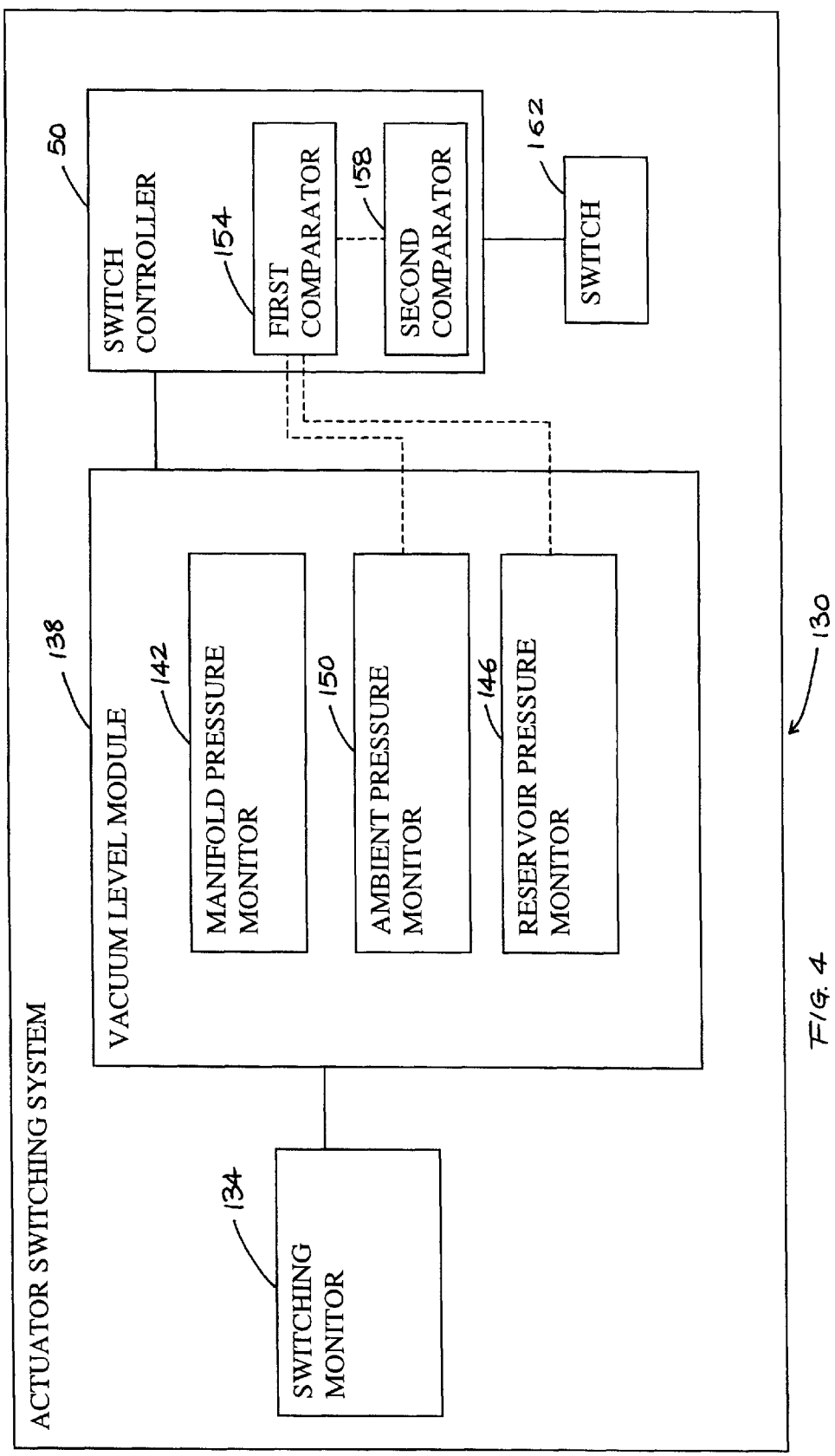
FIG. 4 illustrates an actuator switching system according to one embodiment of the invention.

FIG. 4 schematically illustrates an actuator switching system 130 that utilizes the actuation algorithm 70 of the present invention. The modules of the system 130 can be software-based modules, and where necessary, are connected to sensors (e.g., pressure sensors) that are known in the art for carrying out the required functions. A switching monitor 134, preferably coupled to or embedded in the ECU 46, first determines that an actuator activation or a switching process is desired. The switching monitor 134 then signals a vacuum level module 138 to determine an amount of vacuum available to actuate the actuator, thereby proceeding with the algorithm 70. The vacuum level module 138 includes a manifold pressure monitor 142 configured to determine the manifold pressure pm (see also block 78 of FIG. 3), a reservoir pressure monitor 146 configured to determine a reservoir pressure pc_0 and/or pc (see also blocks 82 and 102 of FIG. 3), and an ambient pressure monitor 150 configured to determine an ambient pressure pa (see also block 98 of FIG. 3).

The manifold pressure monitor 142 is preferably a suitable pressure sensor, e.g. the manifold pressure sensor 54, communicating with the manifold 22, however, the manifold pressure pm can alternatively be modeled based on the measured mass flow of air and the position of the throttle plate. The ambient pressure monitor 150 is preferably a suitable pressure sensor, e.g. the ambient pressure sensor 66, communicating with the ambient environment, however, the ambient pressure pa can alternatively be modeled based on the manifold pressure observed before engine start-up.

As described above, the reservoir pressure monitor 146 is preferably in the form of a mathematical model embedded in a suitable processor (e.g., the ECU 46). While different mathematical models can be employed, the model used in the illustrated embodiment utilizes a lowpass filter. One embodiment of the lowpass filter is formulated as follows:

$$y[n]=y[n-1]+\delta T(x[n]-y[n-1])/Tc,$$

where $y[n]$ is a current modeled reservoir pressure (pc) or the output of the lowpass filter, $y[n-1]$ is a past modeled reservoir pressure or the past output of the lowpass filter, $x[n]$ is a manifold pressure (pm) or the input of the lowpass filter, $\delta T$ is a time step or a time differential or a computing time step, and Tc is a time constant which gives a characteristic speed of the lowpass filter. A typical value of $\delta T$ is 10 ms, but it can also take on other values such as 1 ms or 1 second. Depending on the volume of the reservoir and the hoses between the reservoir and the manifold, Tc typically ranges from 5 to 15 seconds, however, with some configurations and operating conditions, Tc can range from 1 to 30 seconds.

Because the actual reservoir pressure approaches the manifold pressure pm with a low pass characteristic, the reservoir pressure pc_0 is modeled by passing the manifold pressure pm through the lowpass filter. While a lowpass filter is used in the preferred embodiment, other types of modeling can be used and can include integrators or more sophisticated procedures that take into account the air flow through the associated pipes.

Once the reservoir vacuum pressure pc_0 is modeled from the manifold pressure pm (see also blocks 82 and 90 of FIG. 3), the switch controller 50 uses the modeled reservoir vacuum pressure to determine if the actuator 26 can be switched. A pressure differential or an absolute difference between the reservoir pressure and the ambient pressure is determined at a first comparator 154 (see also block 106 of FIG. 3). At a second comparator 158, the switch controller 50 compares the absolute pressure difference with the predetermined threshold value representative of the amount of vacuum needed to effectuate the switching of the actuator 26 (see also block 110 of FIG. 3).

When the switch controller 50 determines that the absolute difference is greater than the predetermined threshold (representing a "YES" answer at block 110 in FIG. 3), that is, a sufficient amount of vacuum pressure is present to actuate the actuator 26, the switch controller 50 enables or actuates the switch 162 (see also block 114 of FIG. 3). When the amount of pressure available to actuate the actuator is less than the predetermined threshold (representing a "NO" answer at block 110 in FIG. 3), the switch controller 50 disables the switch 162 (see also block 120 of FIG. 3).

If the switch 162 is disabled, the actuator 26 is prevented from being actuated until the algorithm 70 and the system 130 determine that there is a sufficient supply of vacuum in the reservoir 58 to provide complete switching. If the switch 162 is enabled, the actuator 26 can be actuated (see also block 116 of FIG. 3). After the actuator flap 26 has been actuated, the lowpass filter mathematical model is adjusted as described above to compensate for the amount of pressure that was used in the previous switching operation (see also blocks 86, 94, and 102 of FIG. 3).

While described in terms of controlling the activation of a single actuator 26, the algorithm 70 and system 130 can be used to control the activation of multiple actuators 26. In this case, the switch controller 50 may be enabled to control a plurality of actuators 26.

When the system 130 is used in conjunction with a loaded actuator, as described above, the system 130 can include an actuator position monitor (not shown) configured to monitor the position (e.g., opened or closed) of the actuator 26. If the actuator 26 is positioned to require vacuum input in order to effect the next switching process, the system 130 runs as described above. However, if the signal from the actuator position monitor indicates that the actuator 26 does not need a vacuum input to effect the next switching process, (i.e., the actuator is biased to return to the home state without any vacuum input), the switch 162 can remain enabled regardless of the amount of vacuum available in the reservoir 58 and regardless of the switching signal value from the switch controller 50.

Various features of the invention are set forth in the following claims:

1. A method of controlling a vacuum-driven actuator in a vehicle, the method comprising:

determining the actuator is to be actuated;

determining an amount of vacuum available to actuate the actuator;

determining whether the available vacuum is sufficient to actuate the actuator;

actuating the actuator only when the available vacuum is sufficient; and preventing actuation of the actuator when the available vacuum is insufficient.

2. The method of claim 1, wherein the vehicle includes a vacuum reservoir for storing the available vacuum, and wherein determining the amount of vacuum available further comprises:

determining a manifold pressure; and using the determined manifold pressure to determine a reservoir pressure.

3. The method of claim 2, wherein determining the amount of vacuum available further comprises:

determining an amount of vacuum lost from the vacuum reservoir during a previous actuation of the actuator; and determining a new reservoir pressure based on the amount of vacuum lost.

4. The method of claim 3, wherein determining the amount of vacuum available further comprises:

determining an ambient pressure.

5. The method of claim 1, wherein the vehicle includes a vacuum reservoir for storing the available vacuum, and wherein determining the amount of vacuum available comprises retrieving a reservoir pressure sensor reading.

6. The method of claim 1, wherein the vehicle includes a vacuum reservoir for storing the available vacuum, and wherein determining the amount of vacuum available comprises modeling the reservoir pressure.

7. The method of claim 1, wherein the vehicle includes a vacuum reservoir for storing the available vacuum, and wherein determining whether the available vacuum is sufficient further comprises:

determining an ambient pressure;

determining a reservoir pressure;

determining an absolute pressure difference between the reservoir pressure and the ambient pressure; and comparing the absolute pressure difference with a predetermined threshold value.

8. The method of claim 1, wherein the actuator is a loaded actuator, and wherein determining the actuator is to be actuated further comprises:

determining that the loaded actuator requires a vacuum input for a next actuation.

9. A method of controlling a vacuum-driven actuator in a vehicle having a manifold and a vacuum reservoir for storing available vacuum, the method comprising:

determining the actuator is to be actuated;

determining an amount of vacuum available to actuate the actuator;

determining whether the available vacuum is sufficient to actuate the actuator;

actuating the actuator only when the available vacuum is sufficient; and preventing actuation of the actuator when the available vacuum is insufficient;

wherein determining the amount of vacuum available further comprises:

determining a manifold pressure; and using the determined manifold pressure to determine a reservoir pressure.

10. The method of claim 9, wherein determining the amount of vacuum available further comprises:

determining whether the actuator has been previously actuated;

if the actuator has been previously actuated, determining an amount of vacuum lost from the vacuum reservoir during the previous actuation of the actuator; and determining a new reservoir pressure based on the amount of vacuum lost.

11. The method of claim 10, wherein determining whether the available vacuum is sufficient further comprises:

determining an absolute pressure difference between the new reservoir pressure and an ambient pressure; and comparing the absolute pressure difference with a predetermined threshold value.

12. The method of claim 9, wherein determining whether the available vacuum is sufficient further comprises:

determining an absolute pressure difference between the reservoir pressure and an ambient pressure; and comparing the absolute pressure difference with a predetermined threshold value.

13. The method of claim 9, wherein the actuator is a loaded actuator, and wherein determining the actuator is to be actuated further comprises:

determining that the loaded actuator requires a vacuum input for a next actuation.

14. An actuator control system in a vehicle, the system comprising:

a switching monitor operable to determine when the actuator is to be actuated;

a vacuum level module operable to determine an amount of vacuum available to actuate the actuator;

a switch operable to actuate the actuator; and a switch controller operable to determine whether the available vacuum is sufficient to actuate the actuator, and to actuate the switch only when the available vacuum is sufficient to actuate the actuator.

15. The system of claim 14, wherein the vehicle includes a vacuum reservoir for storing the available vacuum, and wherein the vacuum level module further comprises:

a manifold pressure monitor operable to determine a manifold pressure;

an ambient pressure monitor operable to determine an ambient pressure; and a reservoir pressure monitor operable to determine a vacuum reservoir pressure.

16. The system of claim 15, wherein the reservoir pressure monitor determines the vacuum reservoir pressure via mathematical modeling.

17. The system of claim 15, wherein the reservoir pressure monitor further comprises a reservoir pressure sensor.

18. The system of claim 15, wherein the manifold pressure monitor further comprises a manifold pressure sensor.

19. The system of claim 15, wherein the ambient pressure monitor further comprises an ambient pressure sensor.

20. The system of claim 15, wherein the switch controller further comprises:

a first comparator operable to find an absolute pressure difference between the ambient pressure and the reservoir vacuum pressure; and a second comparator operable to compare a predetermined threshold value and the absolute pressure difference.

* * * * *